United States Patent
Kubiak et al.

(10) Patent No.: US 12,063,476 B2
(45) Date of Patent: Aug. 13, 2024

(54) IN-CAR ASSISTIVE AUDIO TECHNOLOGIES FOR USERS WITH HEARING LOSS

(71) Applicant: CERENCE OPERATING COMPANY, Burlington, MA (US)

(72) Inventors: Aleksandra Maria Kubiak, Ulm (DE); Guido Kolano, Ulm (DE)

(73) Assignee: CERENCE OPERATING COMPANY, Burlington, MA (US)

( * ) Notice: Subject to any disclaimer, the term of this patent is extended or adjusted under 35 U.S.C. 154(b) by 223 days.

(21) Appl. No.: 17/810,116

(22) Filed: Jun. 30, 2022

(65) Prior Publication Data
US 2024/0007803 A1    Jan. 4, 2024

(51) Int. Cl.
*H04R 25/00* (2006.01)
*G06F 3/16* (2006.01)
*H04R 3/00* (2006.01)

(52) U.S. Cl.
CPC .......... *H04R 25/505* (2013.01); *G06F 3/165* (2013.01); *H04R 3/00* (2013.01); *H04R 25/554* (2013.01); *H04R 25/558* (2013.01); *H04R 2225/55* (2013.01); *H04R 2225/61* (2013.01); *H04R 2499/13* (2013.01)

(58) Field of Classification Search
CPC ...... H04R 25/505; H04R 3/00; H04R 25/554; H04R 25/558; H04R 2225/55; H04R 2225/61; H04R 2499/13; G06F 3/165
USPC ........................................................ 381/315
See application file for complete search history.

(56) References Cited

U.S. PATENT DOCUMENTS

| | | |
|---|---|---|
| 2017/0289683 A1 | 10/2017 | Eichfeld et al. |
| 2019/0045293 A1 | 2/2019 | Blau et al. |
| 2020/0066070 A1 | 2/2020 | Wells |
| 2020/0221240 A1 | 7/2020 | Pye et al. |

FOREIGN PATENT DOCUMENTS

| | | | |
|---|---|---|---|
| DE | 102014218065 A1 | 3/2016 | |
| WO | WO-2024006330 A1 * | 1/2024 | ............. G06F 3/165 |

* cited by examiner

*Primary Examiner* — Phylesha Dabney
(74) *Attorney, Agent, or Firm* — Brooks Kushman, P.C.

(57) ABSTRACT

A hearing application for a vehicle audio system may include at least one speaker configured to play playback content, and at least one hearing application programmed to receive optimization parameters from a hearing device within the vehicle, the optimization parameters including signal processing parameters specific to the hearing device, apply the optimization parameters to the playback content, and transmit the playback content for playback by one of the hearing device and/or at least one speaker.

20 Claims, 4 Drawing Sheets

| | | | | audio-consumer profile | | | | |
|---|---|---|---|---|---|---|---|---|
| | ID | age | gender | psychoacoustic test result | pure tone auditory results | hearing device profile | optimization parameters | preferences |
| user 1 | 014 | 18 | M | | | n/a | | |
| user 2 | 397 | 82 | F | | | Signia Motion 13 Nx | | |
| user n | 639 | 56 | F | | | HA-1800 Cool Aids CIC | | |

FIG. 4

IN-CAR ASSISTIVE AUDIO TECHNOLOGIES FOR USERS WITH HEARING LOSS

FIELD OF INVENTION

Described herein are mechanisms for in car assistive audio technologies for users with hearing loss.

BACKGROUND

Users with hearing loss often wear hearing aids, and also wear their hearing aids within a vehicle. However, vehicle audio systems may fail to account for the user's hearing loss and the presence of hearing aid devices when the user is in the vehicle.

SUMMARY

A hearing application for a vehicle audio system may include at least one speaker configured to play playback content, and at least one hearing application programmed to receive optimization parameters from a hearing device within the vehicle, the optimization parameters including signal processing parameters specific to the hearing device, apply the optimization parameters to the playback content, and transmit the playback content for playback by one of the hearing device and/or at least one speaker.

A hearing application for a vehicle audio system, the system may include at least one speaker configured to play playback content, and at least one hearing application programmed to identify at least one user within the vehicle, receive an audio-consumer profile associate with the user, the audio-consumer profile including signal processing parameters specific to the user, apply the optimization data to the playback content, and transmit the playback content for playback by the at least one speaker.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Hearing loss affects a large portion of the population. Approximately 360 million people worldwide suffer from hearing loss, most of whom are adults. Many of these adults enjoy the use of automobiles in one way or another as their preferred form of transportation. However, sound systems within automobiles do not sufficiently take hearing loss, or hearing devices, into consideration during their operation.

Disclosed herein are systems and methods for a hearing application for providing in-vehicle assistive audio technology to those users with hearing loss. The hearing application will allow for better speech intelligibility and overall audio experience without a need for wearing hearing aid devices while driving or riding in a vehicle. The hearing application interfaces with the vehicle's infotainment system. The hearing application may maintain audio-consumer-profiles having personalized audio models that control audio processing layers applied to the audio output of the vehicle audio system. This may include telephony and speech dialog systems, public announcement (PA) systems, public transport systems or the like. This additional processing layer also ensures a personalized audio experience, such as better speech intelligibility, desires equalization, stronger noise reduction, etc. These experiences are tailored individually to the user's needs to diminish the impact of existing hearing loss.

This enhanced audio can be played back through the vehicle's speakers, or directly streamed to the user's hearing aid. The audio-consumer-profiles may be received from the hearing-aid itself, the hearing aid manufacturer, or from personalized data such as age and audiogram, individual hearing ratings, as well as user's audio adjustment history. Such adjustments may be made in the hearing application, as well as the infotainment devices in the vehicle, or using hands-free software. The profiles may be stored in the hearing application or audio system of the vehicle, and may also be exported to an offsite server for further analysis or transfer to other vehicles via a user-profile.

Users without hearing impairments may also benefit from the hearing application in that the hearing application may issue hearing tests, recognize unknown hearing issues, and provide a personal profile for the user in response to the hearing test.

Figure 1:
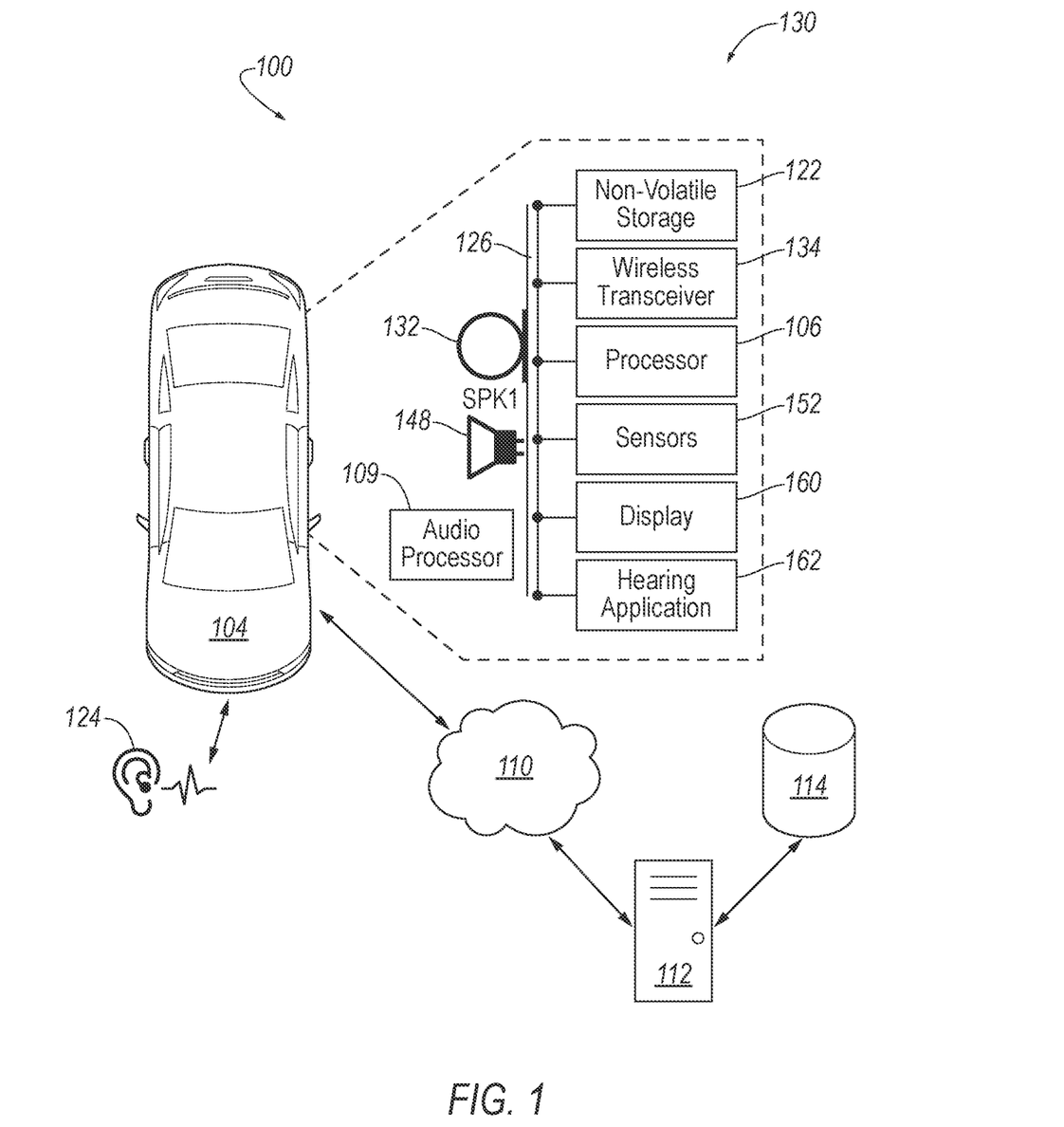
FIG. 1 illustrates a block diagram for a hearing application in an automotive system in accordance with one embodiment.

FIG. 1 illustrates a block diagram for a hearing application 162 in an automotive system 100 in accordance with one embodiment. The automotive system 100 may be designed for a vehicle 104 configured to transport passengers. The vehicle 104 may include various types of passenger vehicles, such as crossover utility vehicle (CUV), sport utility vehicle (SUV), truck, recreational vehicle (RV), boat, plane or other mobile machine for transporting people or goods. Further, the vehicle 104 may be autonomous, partially autonomous, self-driving, driverless, or driver-assisted vehicles. The vehicle 104 may be an electric vehicle (EV), such as a battery electric vehicle (BEV), plug-in hybrid electric vehicle (PHEV), hybrid electric vehicle (HEVs), etc.

The vehicle 104 may be configured to include various types of components, processors, and memory, and may communicate with a communication network 110. The communication network 110 may be referred to as a "cloud" and may involve data transfer via wide area and/or local area networks, such as the Internet, Global Positioning System (GPS), cellular networks, Wi-Fi, Bluetooth, etc. The communication network 110 may provide for communication between the vehicle 104 and an external or remote server 112 and/or database 114, as well as other external applications, systems, vehicles, etc. This communication network 110 may provide navigation, music or other audio, program content, marketing content, internet access, speech recognition, cognitive computing, artificial intelligence, to the vehicle 104.

The remote server 112 and the database 114 may include one or more computer hardware processors coupled to one or more computer storage devices for performing steps of one or more methods as described herein and may enable the vehicle 104 to communicate and exchange information and data with systems and subsystems external to the vehicle 104 and local to or onboard the vehicle 104. The vehicle 104 may include one or more processors 106 configured to perform certain instructions, commands and other routines as described herein. Internal vehicle networks 126 may also be included, such as a vehicle controller area network (CAN), an Ethernet network, and a media oriented system transfer (MOST), etc. The internal vehicle networks 126 may allow the processor 106 to communicate with other vehicle 104 systems, such as a vehicle modem, a GPS module and/or Global System for Mobile Communication (GSM) module configured to provide current vehicle location and heading information, and various vehicle electronic control units (ECUs) configured to corporate with the processor 106.

The processor 106 may execute instructions for certain vehicle applications, including navigation, infotainment, climate control, etc. Instructions for the respective vehicle systems may be maintained in a non-volatile manner using a variety of types of computer-readable storage medium 122. The computer-readable storage medium 122 (also referred to herein as memory 122, or storage) includes any non-transitory medium (e.g., a tangible medium) that participates in providing instructions or other data that may be read by the processor 106. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/structured query language (SQL).

The processor 106 may also be part of a multimodal processing system 130. The multimodal processing system 130 may include various vehicle components, such as the processor 106, memories, sensors, input devices, displays, etc. The multimodal processing system 130 may include one or more input and output devices for exchanging data processed by the multimodal processing system 130 with other elements shown in FIG. 1. Certain examples of these processes may include navigation system outputs (e.g., time sensitive directions for a driver), incoming text messages converted to output speech, vehicle status outputs, and the like, e.g., output from a local or onboard storage medium or system. In some embodiments, the multimodal processing system 130 provides input/output control functions with respect to one or more electronic devices, such as a heads-up-display (HUD), vehicle display, and/or mobile device of the driver or passenger, sensors, cameras, etc. The multimodal processing system 130 includes a hearing application 162 configured to aid users within the vehicle with hearing loss to optimally receive audio signals from the vehicle infotainment system. Users may be one of the driver or a passenger within the vehicle 104. In some example, the passenger may be detected via weight sensors in the seats as well as sensors observing whether a seat belt has been closed.

The vehicle 104 may include a wireless transceiver 134, such as a BLUETOOTH module, a ZIGBEE transceiver, a Wi-Fi transceiver, an IrDA transceiver, a radio frequency identification (RFID) transceiver, etc.) configured to communicate with compatible wireless transceivers of various user devices, as well as with the communication network 110.

The vehicle 104 may include various sensors and input devices as part of the multimodal processing system 130. For example, the vehicle 104 may include at least one microphone 132. The microphone 132 may be configured receive audio signals from within the vehicle cabin, such as acoustic utterances including spoken words, phrases, or commands from a user. The microphone 132 may include an audio input configured to provide audio signal processing features, including amplification, conversions, data processing, etc., to the processor 106. The vehicle 104 may include at least one microphone 132 arranged throughout the vehicle 104. While the microphone 132 is described herein as being used for purposes of the multimodal processing system 130, the microphone 132 may be used for other vehicle features such as active noise cancelation, hands-free interfaces, etc. The microphone 132 may facilitate speech recognition from audio received via the microphone 132 according to grammar associated with available commands, and voice prompt generation. The microphone 132 may include a plurality of microphones 132 arranged throughout the vehicle cabin. The microphone 132 may be configured to receive audio signals from the vehicle cabin. These audio signals may include occupant utterances, sounds, etc., and may include instructions, wake-up-words, etc. The microphone 132 may also detect and pick up noise level and other ambient noise characteristics. This may be used for noise cancelation or other processing that may be noise dependent.

The vehicle 104 may include an audio system having audio playback functionality through an audio processor (sound system) 109 and vehicle speakers 148 or headphones. The audio playback may include audio from sources such as a vehicle radio, including satellite radio, decoded amplitude modulated (AM) or frequency modulated (FM) radio signals, and audio signals from compact disc (CD) or digital versatile disk (DVD) audio playback, streamed audio from a mobile device, commands from a navigation system, etc.

As explained, the vehicle 104 may include various displays and user interfaces, including HUDs, center console displays, steering wheel buttons, etc. Touch screens may be configured to receive user inputs. Visual displays may be configured to provide visual outputs to the user.

The vehicle 104 may include other sensors such as at least one sensor 152. This sensor 152 may be another sensor in addition to the microphone 132, data provided by which may be used by the hearing application 162. In one example, the sensor 152 may include a power mat configured to detect the presence of a device such as a mobile device or hearing device 124. The power mat may be configured to wirelessly charge these devices and may indicate the presence of the hearing device 124 to the hearing application 162. The hearing application 162 may then determine that the hearing device 124 is located on the power mat for charging and is not currently being worn by the user In one example, the hearing device 124 may be off, or is being charged. In this example, the hearing device 124 is not connected to the vehicle 104. In another example, the hearing aid may be worn and already paired with the user device, and thus no other devices may be able to offer connectivity to the hearing device 124.

In another example, the hearing device 124 may be charged within a case or charging station. The charging station may offer USB connectivity to the vehicle to draw power. The case itself may also rest on a charging mat to wirelesses charge, and in turn, recharge the hearing device 124 nested within the case.

The hearing device 124 may be a device worn by a user within the vehicle 104 to provide acoustic amplification of sounds to a user's ear. These devices are typically worn in and around the ear by users having impaired hearing. The hearing device 124 may be battery powered and may be recharged via wired or wireless charging. The hearing device 124 may also, in some examples, include headphones, both in and over the ear.

The hearing device 124 may communicate with the vehicle systems via the internal vehicle network 126 or other wireless networks via the wireless transceiver 134 including BLUETOOTH, Wi-Fi, etc. The hearing device 124 may transmit optimization data to the hearing application 162 and the vehicle 104 may transmit playback signals, as well as other information to the hearing device via the hearing application 162. While the hearing application 162 is shown as being separate and distinct from the processor 106, the hearing application 162 may be included in the processor 106, have its own processor or controller, or be integrated into a user device such as a mobile device.

While not specifically illustrated herein, the vehicle 104 may include numerous other systems such as GPS systems, human-machine interface (HMI) controls, video systems, etc. The multimodal processing system 130 may use inputs from various vehicle systems, including the audio processor 109 and the sensors 152. For example, the multimodal processing system 130 may determine whether an utterance by a user is system-directed (SD) or non-system directed (NSD). SD utterances may be made by a user with the intent to affect an output within the vehicle 104 such as a spoken command of "turn on the music." A NSD utterance may be one spoken during conversation to another occupant, while on the phone, or speaking to a person outside of the vehicle. These NSDs are not intended to affect a vehicle output or system. The NSDs may be human-to-human conversations.

While an automotive system is discussed in detail here, other applications may be appreciated. For example, similar functionally may also be applied to other, non-automotive cases, e.g. for augmented reality or virtual reality cases with smart glasses, phones, eye trackers in living environment, etc. While the term "user" is used throughout, this term may be interchangeable with others such as speaker, occupant, etc.

Figure 2:
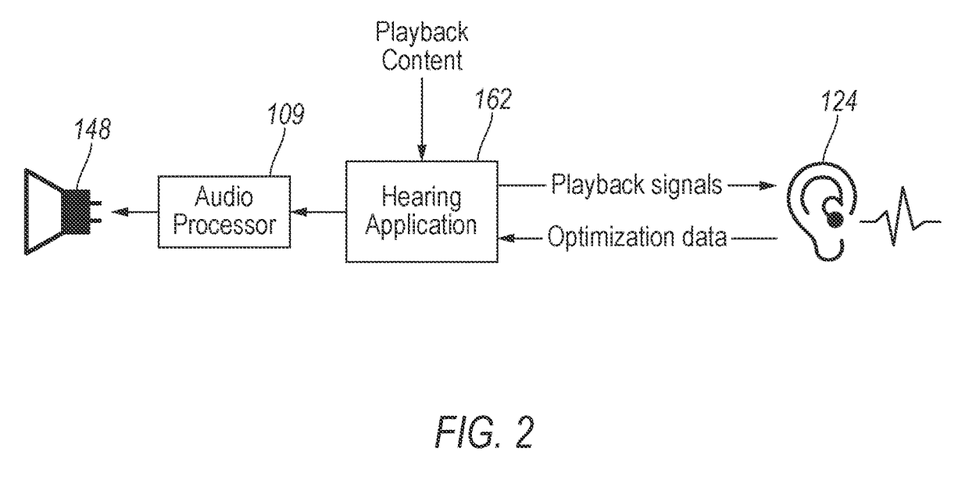
FIG. 2 illustrates an example block diagram of at least a portion of the system of FIG. 1.

FIG. 2 illustrates an example block diagram of at least a portion of the system of FIG. 1 including the hearing application 162, audio processor 109, speaker 148, and hearing device 124. As explained above, once a user is within the vehicle, the user's hearing device 124 may communicate with the vehicle systems via the internal vehicle network 126 or other wireless radio frequency channels via the wireless transceiver 134 including BLUETOOTH, Wi-Fi, ZIGBEE etc. The hearing device 124 may also communicate via optical channels such as infrared light. The hearing device 124 may transmit optimization data to the hearing application 162. This optimization data may include data about the hearing device 124 such as manufacture settings, user specific preferences, settings or signal processing requirements, among other data relating to the hearing impairments of the user.

In response to the hearing device 124 being worn by the user within the vehicle 104, the hearing application 162 may transmit playback signals to the hearing device 124. The playback signals may include audio signals typically emitted via the vehicle speaker 148. That is, besides the audio playback from telephony or speech dialogs, or other channels like navigation or alerts, as well as entertainment signals from the radio, infotainment, etc., may be streamed to the hearing device 124. Such streaming may run parallel to normal audio playback via the vehicle speakers 148, for example, when another user is within the vehicle 104. In this situation, the hearing application may initiate latency of the streaming, so that the playback from both the hearing device 124 and the vehicle speaker 148 are in sync so as to avoid reverberance. Depending on the audio architecture, the hearing application 162 may increase the latency of the audio processor 109 or of the audio channel for the hearing device 124 (e.g. in the hearing application 162). The latency introduced by the audio processing in the hearing device 124 may be part of the optimization data transmitted to the hearing application 162. Since one of the configuration parameters of the hearing application 162 is the latency of the vehicle audio system, the hearing application 162 may calculate the required delay that needs to be introduced in the respective path in order to synchronize the different playback systems.

The hearing device 124, upon receiving the playback signals from the hearing application 162, may apply audio processing prescribed by that device. That is, the settings typically applied to by the hearing device 124 under normal amplification are also applied to the playback signals. This allows the user to receive playback of audio typically presented via the vehicle speaker 148 at the hearing device 124 with the user's settings. This may increase the ability to hear commands from the vehicle 104.

In the event that playback content is emitted at both the speaker 148 and the hearing device 124, the playback at the speaker 148 may not be processed with the optimization parameters. This may be because there may be another user in the vehicle that is not in need of any hearing optimized processes, and to the extent the other user would benefit from the optimization parameters, this user is already receiving the optimized playback via the hearing device 124.

Conversely, users may often remove their hearing device 124 when they enter the vehicle 104. This may be for comfort or for charging the hearing device 124. During this example, the telephony or speech dialog may be provided via the speaker 148, but the hearing application 162 may apply additional audio processing to the playback. The hearing application 162 may receive playback content from the vehicle 104, such as the vehicle infotainment systems, or processor 106. The playback content may include the telephone or speech dialog, which may be processed by the hearing application 162 based on the optimization data received from the hearing device 124. The optimization data may be received once and stored by the hearing application 162 for future use, but may also be continually updated in the event that user specific or model specific settings and data have changed. The settings may be vendor provided via the communication network 110, or may be provided from the hearing aid 124.

The hearing application 162 may apply the parameters or optimizations based on the optimization data and then provide the playback content to the speaker 148. The format of the parameters and audio processing algorithms are shared between the vendor of the hearing device 124 and the audio systems of the vehicle 104 such as the audio processor 109. In some examples, a conversion module may be included to facilitate any misunderstanding of the various parameters and signal processing algorithms between the audio processor 109 and the hearing device 124. Regardless, the optimization data, whether provided by the vendor via the communication network 110 or the hearing device 124, allows for a better listening experience within the vehicle for the hearing-impaired user but applying the necessary audio processing on top of the vehicle's processing.

The hearing application 162 may thus interface with the vehicle 104 and the hearing device 124 to facilitate communication therebetween. The hearing application 162 may be installed in the vehicle's non-volatile storage 122 and may be processed by the processor 106. Additionally or alternatively, the hearing application 162 may be on a user's mobile device configured to communicate with the vehicle 104 via telematics.

The hearing application 162 may also be configured to collect hearing related data from a user within the vehicle 104. This may include a set of psychoacoustic tests within the vehicle. These tests may be seat specific, as well as factor specific, such as perceived loudness, preferred loudness and equalization, individual speech intelligibility in presence of driving noise, etc. Responses by the user may be included in the hearing related data and processed by the hearing application 162. The user may also provide personal data such as age, gender, etc. Pure-tone audiometry results acquired from a third party may also be shared with the hearing application 162. Such results may be uploaded via the hearing application 162 by the user using the user's mobile device.

The hearing application 162 may use the hearing related data and/or the personal data to generate an audio-consumer profile for the respective user. The audio-consumer profile may include the optimization parameters or data specific to the user. That is, in the above examples where the optimization parameters are specific to the hearing device 124, here, the optimization parameters are specific to the user. This may allow for an enhanced and personalized audio experience for all users, not just those having a hearing device.

The psychoacoustic tests may be generated by hearing device vendors, or the hearing application 162 itself. In one example, the hearing application 162 may issue an inquiring asking if a hearing impairment has been previously diagnosed. If the user responses in the negative, a typical or default sensitivity or threshold curve may be used. Third parties may also generate the psychoacoustic tests, as well as analyze the responses thereto. In the example where a normal-hearing enabled user is present, and no known hearing impairment has been previously diagnosed, a standardized hearing test may be given. Notably, cases occur where a user scores normal (or close to normal) on one hearing test, e.g., in an audiogram-like test administrated in silence, but has below normal score on a test performed in more complex listening conditions (e.g., speech intelligibility in noise). Simple hearing test, which may be usually held in silence, do not have a resolution to show life-like listening issues and may be overlooked. Hence, such hearing tests should not be limited to some simple audiogram tones, but may cover more life-like cases matching the given listening scenario. Also, the order of the tests and exactly which tests will be performed, may depend on the results of tests previously performed. The hearing application 162 may determine, in addition to which vendor's test to use, the order of existing tests, the type of test, etc.

The audio-consumer profile may be stored within the vehicle's memory, e.g., non-volatile storage 122, and/or the user's mobile-phone and/or the remote server 112. As explained, the remote server 112 may be associated with the vendor of the hearing device 124. The audio-consumer profile may be exported to the server 112 in order to save the profile. The audio-consumer profile may then be used by another vehicle, should the user enter another hearing application enabled vehicle. This may allow for a seamless user audio experience in each enabled vehicle that the user enters.

The user may be identified in one of several ways. One example is that the vehicle telematics system may detect the user's mobile device and recognize the user based on a handshake with the mobile device. This may occur when the hearing application 162 or vehicle telematics system pairs with the mobile device. The processor 106 may indicate the user's identity to the hearing application 162 and may automatically retrieve the previously stored audio-consumer profile for that user. The user may also enter an ID and password via the vehicle display 160, the user's mobile device, etc. Audible recognition may also be used to identify the user.

The user may have a user profile accessible once the user is identified and authenticated via any of the mechanisms described above. The user profile may allow the user to periodically alter the audio-consumer profile, as well as settings and preferences. In one example, the user may update his or her hearing device vendor, or the make and model of the hearing device. In the example where the hearing application 162 is housed on the user's mobile device, the user may modify settings when not within the vehicle 104 as well.

The audio-consumer profile may be continually updated to improve the optimization parameters. In one example, the hearing application 162 may employ machine learning technologies to update profiles based on recent audio settings chosen by the user. For example, the hearing application 162 may change the gain or equalization preferences in a given environmental condition or playback setting, etc. These adjustments may be made without input from the user. The adjustments may be made based on new data, or aggregated data, including personal data of related users, other psychoacoustic tests, etc. By employing machine learning to constantly improve audio-consumer profiles, the user may enjoy assistive hearing technology that is constantly improving, as well as personalized settings, through the years, and throughout the use of different car models.

Figure 3:
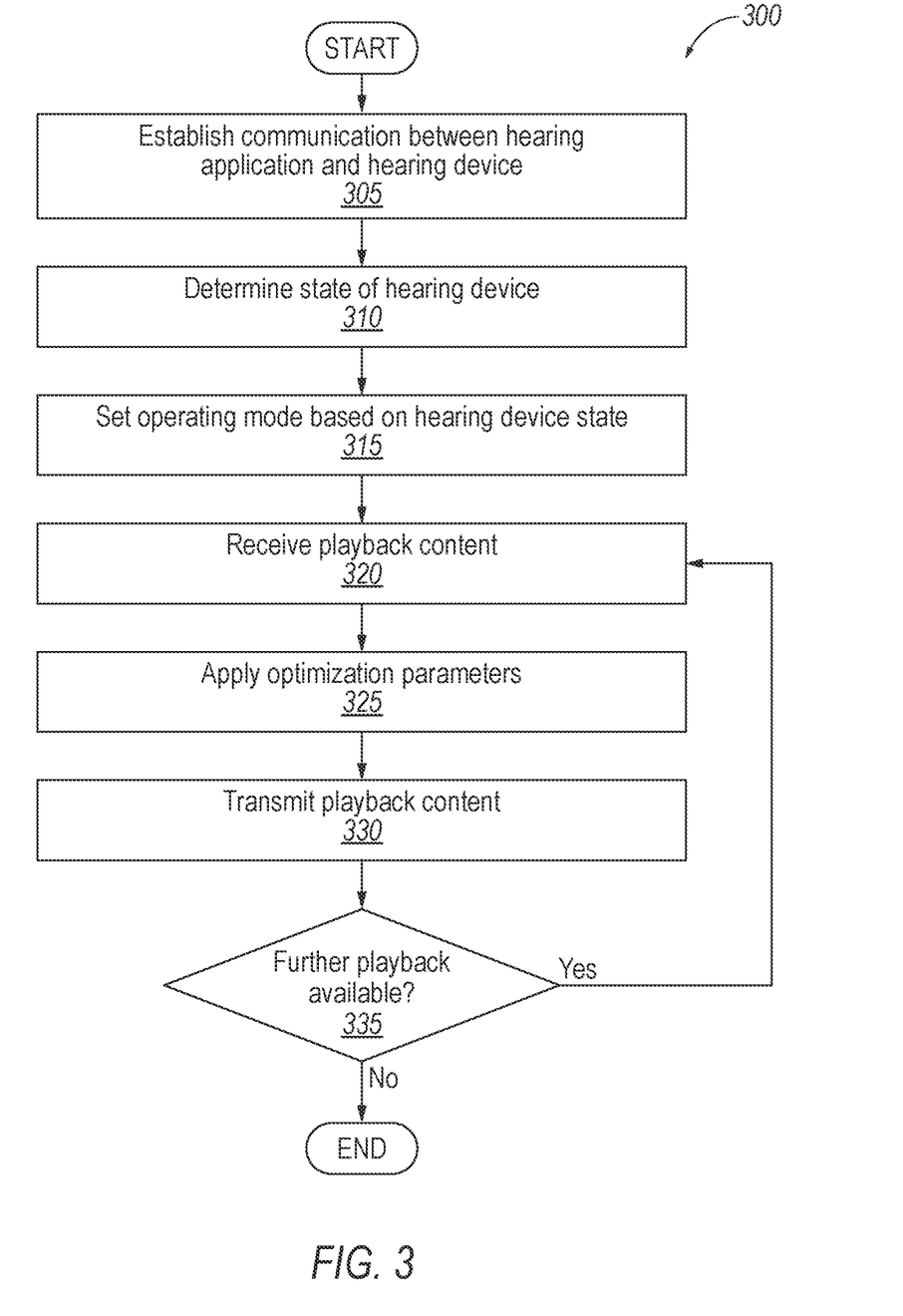
FIG. 3 illustrates an example flow chart for a process for the hearing application of FIG. 1.

FIG. 3 illustrates an example flow chart for a process 300 for the hearing application 162 of FIG. 1 where the hearing application 162 establishes an interface between the vehicle 104 and the hearing device 124. The process 300 begins at block 305 where the hearing application 162 establishes communication with the hearing device 124. This may occur when the user enters the vehicle 104 and is within range for the wireless transceiver 134 to detect the hearing device 124. The transceiver 134 and the hearing device 124 may transmit requests and responses until the two devices pair with one another. They may include BLUETOOTH or other similar radio frequency communication. The hearing application 162 may require certain security or pins to be exchanged, at least upon an initial paring, but may otherwise pair automatically after the initial pairing.

Once the hearing application 162 and the hearing device 124 have established communication, the hearing application 162 may determine the state of the hearing device at block 310. The hearing device 124 state may be an indication of whether the hearing device 124 is in in-ear or out-of-ear. An in-ear state may be the default state and the hearing application 162 may determine that the hearing device 124 is in-ear contrary to an indication that it is not. For example, the detection of a magnetic field at the power mat may indicate the presence of a hearing device 124 and thus the hearing device 124 is considered out-of-ear." The hearing application 162 may pole vehicle sensors, such as sensor 152, to determine if there is an indication that the hearing device 124 is out-of-ear. In one example, if the hearing device 124 or case of the hearing device 124 has been placed on a charger, or connected via USB, the charger may transmit a signal to the hearing application 162 that the hearing device is being charged.

At block 315, the hearing application 162 may establish an operating mode based at least in part on the hearing device state. In an out-of-ear state, the operating mode may be a speaker play back mode where playback content is routed through the speaker 148. In an in-ear state, the operating mode may be a hearing device playback mode where the playback content is routed through the hearing device 124.

At block 320, the hearing application 162 may receive playback content from the vehicle 104. The playback content may include telephony and speech content, as well as audio such as music or other infotainment audio content, to be played back for the user. The playback content may have undergone signal processing traditionally carried out by the vehicle audio and infotainment systems such as active noise cancelation, amplification, equalization, etc.

At block 325, the hearing application 162 may apply the optimization data received from the hearing device 124 and/or the vendor of the hearing device 124. As explained, the optimization data may include various parameters for applying additional signal processing to the playback content.

At block 330, the hearing application 162 may transmit the playback content to the speaker 148 in the speaker play back mode or to the hearing device 124 in the hearing device playback mode. The user may then enjoy the playback with the extra layer of signal processing specific to the user and/or the user's hearing device 162.

Figure 4:
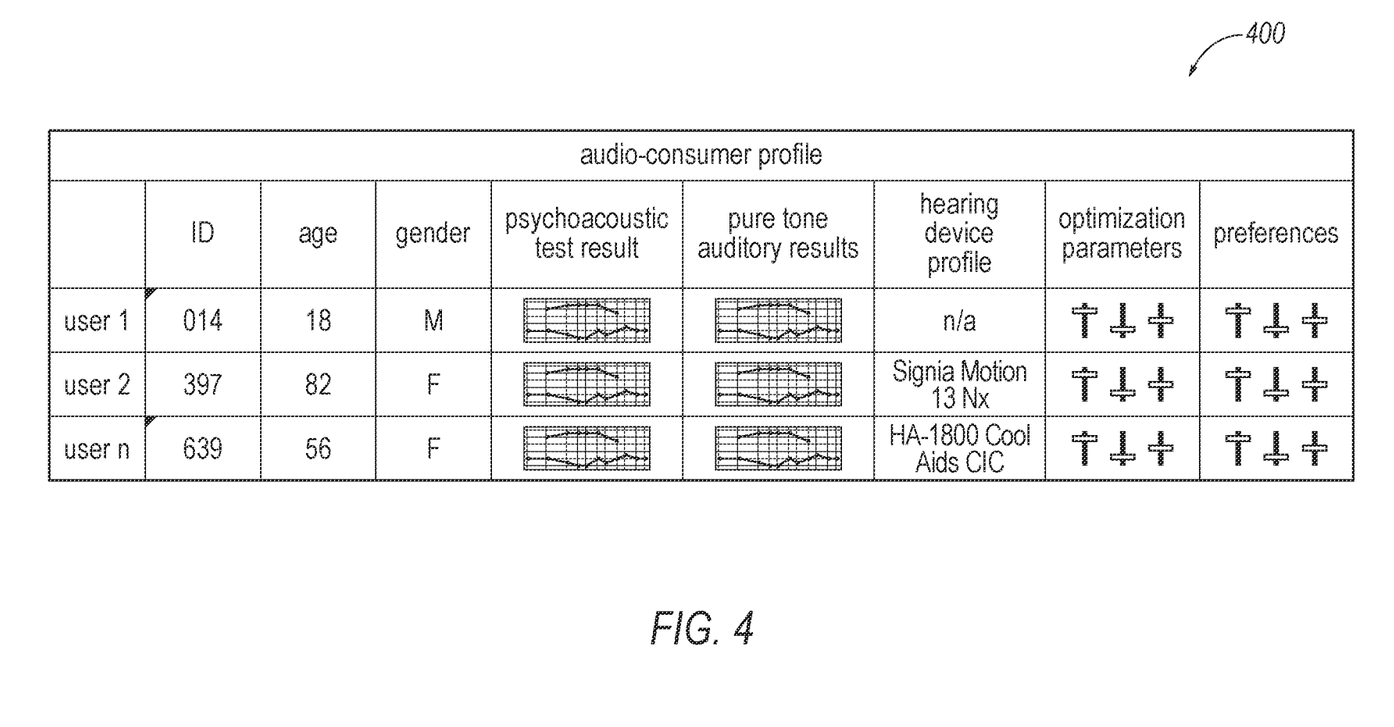
FIG. 4 illustrates an example database of audio-consumer profiles for the hearing application of FIG. 1.

FIG. 4 illustrates an example database 400 for audio-consumer profiles. As explained above, the hearing application 162 may be configured to collect hearing related data from a user within the vehicle 104. This may include a set of psychoacoustic tests within the vehicle. These tests may be seat specific, as well as factor specific, such as perceived loudness, preferred loudness and equalization, individual speech intelligibility in presence of driving noise, etc. Responses by the user may be included in the hearing related data and processed by the hearing application 162. The results may be collected via the vehicle speaker 148, or from the user's mobile device, the display 160, etc. The user may also provide personal data such as age, gender, etc. Pure-tone audiometry results performed by a third party may also be shared with the hearing application 162. While FIG. 4 illustrates example profiles, more or less data may be included. Users may also opt to decline to provide certain details, such as his or her age, etc.

The hearing application 162 may use the hearing related data and/or the personal data to generate an audio-consumer profile for the respective user. The audio-consumer profile may include the optimization parameters specific to the user. That is, in the above examples where the optimization parameters are specific to the hearing device 124, here, the optimization parameters are specific to the user. This may also for an enhanced and personalized audio experience for all users, not just those having a hearing device.

The audio-consumer profile may be stored within the vehicle's memory, e.g., non-volatile storage 122, and/or the user's mobile-phone and/or the remote server 112. As explained, the remote server 112 may be associated with the vendor of the hearing device 124. The audio-consumer profile may be exported to the server 112 in order to save the profile. The audio-consumer profile may then be used by another vehicle, should the user enter another hear in application enabled vehicle. This may allow for a seamless user audio experience.

The audio-consumer profile associated with the user may be retrieved once the user is identified and authenticated.

The user may periodically alter the audio-consumer profile, as well as settings and preferences. In one example, the user may update his or her hearing device vendor, or the make and model of the hearing device. In the example where the hearing application 162 is housed on the user's mobile device, the user may modify settings when not within the vehicle 104 as well.

As explained, by exporting the audio-consumer profiles, various servers, vendors, etc., may aggregate the data and use the data to improve the optimization parameters. In one example, the hearing application 162 may employ machine learning technologies to update profiles based on recent audio settings chosen by the user. For example, the hearing application 162 may change the gain or equalization preferences in a given environmental condition or playback setting, etc. These adjustments may be made without input from the user. The adjustments may be made based on new data, or aggregated data, including personal data of related users, other psychoacoustic tests, etc. By employing machine learning to constantly improve audio-consumer profiles, the user may enjoy assistive hearing technology that is constantly improving, as well as personalized settings, through the years, and throughout the use of different car models.

Accordingly, a vehicle audio system for allowing users, especially hearing-impaired users, to enjoy a better in-vehicle audio experience, is described herein. The assistive hearing technology allows for audio processing tailored to a user's individual needs and preferences for both hearing-impaired and normal-hearing users. The user has the option to remove his or her hearing device during use of the vehicle. The inconvenience of wearing a hearing aid may be avoided, and the opportunity to charge the hearing device during a user's time in a vehicle is now possible. Further, the system described herein may allow users unaware of any hearing deficiencies to become aware, as well as increase hearing abilities within the vehicle. Users with normal hearing abilities may enjoy a customized and personalized audio processing system that better matches their tastes and preferences.

The audio-consumer profile may be dynamic and continuously change based on user's demographics, life, habits, health, etc. The ability to store and export preferred settings, as well as to constantly develop and improve the audio-consumer profile by applying machine learning, increases the value of the technology. Such audio-consumer profiles could follow the users throughout the years and through multiple vehicles via the hearing application.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hearing application for a vehicle audio system, the system comprising:
    at least one speaker configured to play playback content;
    at least one hearing application programmed to
        receive optimization parameters from a hearing device within the vehicle, the optimization parameters including signal processing parameters specific to the hearing device;
        apply the optimization parameters to the playback content; and
        transmit the playback content for playback by one of the hearing device and the at least one speaker.

2. The system of claim 1, wherein the hearing application is further programmed to determine that the hearing device is in an in-ear state or an out-of-ear state.

3. The system of claim 2, wherein the hearing application is further programmed to transmit the playback content to the hearing device in response to the hearing device being in an in-ear state.

4. The system of claim 3, wherein the hearing application is further programmed to transmit the playback content to the at least one speaker concurrent with transmitting the playback content to the hearing device.

5. The system of claim 4, wherein the hearing application is further programmed to apply latency to the playback content transmitted to the hearing device to avoid reverberance, wherein the playback content at the at least one speaker is not optimized.

6. The system of claim 2, wherein the hearing application is further programmed to transmit the playback content to the at least one speaker in response to the hearing device being in an out-of-ear state.

7. The system of claim 1, wherein the optimization parameters are specific to the hearing device.

8. The system of claim 1, wherein the hearing device and the hearing application communicate via a wireless communication protocol.

9. A hearing application for a vehicle audio system, the system comprising:
    at least one speaker configured to play playback content;
    at least one hearing application programmed to
        identify at least one user within the vehicle;
        receive an audio-consumer profile associate with the user, the audio-consumer profile including signal processing parameters specific to the user;
        apply the optimization data to the playback content; and
        transmit the playback content for playback by the at least one speaker.

10. The system of claim 9, wherein the audio-consumer profile includes optimization parameters from a hearing device associated with the at least one user, the optimization parameters including signal processing parameters specific to the hearing device.

11. The system of claim 10, wherein the optimization parameters are received from a vendor of the hearing device.

12. The system of claim 11, wherein the hearing application is further programmed to transmit the playback content to the at least one speaker in response to the hearing device being in an out-of-ear state.

13. The system of claim 11, wherein the hearing device and the hearing application communicate via a wireless communication protocol.

14. The system of claim 13, wherein the hearing application is further programmed to transmit the updated audio-consumer profile to a remote server.

15. The system of claim 10, wherein the hearing application is further programmed to determine that the hearing device is in an in-ear state or an out-of-ear state.

16. The system of claim 15, wherein the hearing application is further programmed to transmit the playback content to the hearing device in response to the hearing device being in an in-ear state.

17. The system of claim 16, wherein the hearing application is further programmed to transmit the playback content to the at least one speaker concurrent with transmitting the playback content to the hearing device.

18. The system of claim 17, wherein the hearing application is further programmed to apply latency to the playback content transmitted to the hearing device to avoid reverberance, wherein the playback content at the at least one speaker is not optimized.

19. The system of claim 9, wherein the hearing application is further programmed to receive user preferences from user input and update the audio-consumer profile based on the user preferences.

20. The system of claim 9, wherein the hearing application is further programmed to receive aggregated system data from a remote server and apply machine learning to the audio-consumer profile to update the audio-consumer profile.

* * * * *